United States Patent
O'Connor et al.

(10) Patent No.: US 9,100,481 B2
(45) Date of Patent: Aug. 4, 2015

(54) SYSTEM AND METHOD FOR MANAGING A CONTACT CENTER

(71) Applicant: Avaya Inc., Basking Ridge, NJ (US)

(72) Inventors: Neil O'Connor, Galway (IE); Paul D'Arcy, Limerick (IE); Dara Geary, Co. Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/786,841

(22) Filed: Mar. 6, 2013

(65) Prior Publication Data

US 2014/0254776 A1 Sep. 11, 2014

(51) Int. Cl.
*H04M 3/51* (2006.01)
*H04M 3/493* (2006.01)
*H04M 3/523* (2006.01)

(52) U.S. Cl.
CPC ............ *H04M 3/5175* (2013.01); *H04M 3/493* (2013.01); *H04M 3/5234* (2013.01); *H04M 2203/556* (2013.01)

(58) Field of Classification Search
CPC ... H04M 3/5175; H04M 3/5233; H04M 3/51; H04M 3/5232; H04M 3/523; H04M 3/5183; H04M 2203/402; H04M 3/493; H04M 15/61; H04M 3/4931

USPC ............... 379/265.01–266.1, 265.02, 265.06, 379/265.05, 265.11, 265.12, 265.03, 265.1, 379/265.13, 265.14, 265.04, 3, 88.01
See application file for complete search history.

(56) References Cited

U.S. PATENT DOCUMENTS

| 8,385,532 | B1 * | 2/2013 | Geist et al. ............... 379/265.03 |
| 8,488,769 | B1 * | 7/2013 | Noble et al. .............. 379/265.02 |
| 2006/0029206 | A1 * | 2/2006 | Anisimov et al. ........ 379/265.03 |
| 2006/0233346 | A1 * | 10/2006 | McIlwaine et al. ...... 379/265.02 |
| 2008/0219429 | A1 * | 9/2008 | Mandalia et al. ........ 379/266.02 |
| 2011/0010173 | A1 * | 1/2011 | Scott et al. ..................... 704/235 |
| 2013/0216037 | A1 * | 8/2013 | Eicholz et al. ........... 379/265.12 |

* cited by examiner

*Primary Examiner* — Akelaw Teshale
(74) *Attorney, Agent, or Firm* — Maldjian Law Group LLC (57) ABSTRACT

A service level controlling system for a contact center is provided. The service level controlling system includes a monitoring module for monitoring predetermined operation statistics, such as call traffic, in the contact center. The service level controlling system further includes a publishing module for publishing pre-configured solutions to each of agents in the contact center based upon at least one of the monitored predetermined operation statistics falling outside a predetermined range. The service level controlling system further includes a controlling module for automatically bringing the at least one of the monitored predetermined operation statistics within the predetermined range based upon execution of the pre-configured solutions selected by the agents.

20 Claims, 5 Drawing Sheets

SYSTEM AND METHOD FOR MANAGING A CONTACT CENTER

BACKGROUND

1. Field of the Invention

Embodiments of the present invention provide a system and a method for managing a contact center. More particularly, embodiments of the present invention provide a system and a method for handling service levels of a contact center.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts.

Contact centers distribute contacts, whether inbound or outbound, for servicing to any suitable resource according to predefined criteria. In many existing systems, the criteria for servicing the contact from the moment the contact center becomes aware of the contact until the contact is connected to an agent are client or operator-specifiable (i.e., programmable by the operator of the contact center), via a capability called vectoring. Normally, in present-day ACDs when the ACD system's controller detects an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is where there are no contacts waiting to be handled.

The primary objective of contact center management is to ultimately maximize contact center performance and profitability. An ongoing challenge in contact center administration is monitoring and optimizing contact center efficiency. Further, every contact center has supervisors, who are responsible for ensuring consistent performance of the contact center. Typically, a supervisor manages a team of 8-15 agents. The supervisors are trained to handle normal call traffic. Therefore, if there is a sudden burst of activities in a contact center, i.e., all agents of that contact center gets busy in handling their callers/customers and there are a lot of requests still coming to the contact center, then it is expected from the supervisor to manage the situation. Further, the supervisor is required to calculate potential consequences, the best course of action, and the response time. These are complex and potentially error prone calculations that are made on the fly by the supervisor.

Additionally, to manage every unexpected situation, the supervisor of the contact center needs to have a good knowledge about the skills of the agents. Therefore, everything is reliant on knowledge of the supervisor. Moreover, the supervisor needs to process a lot of information manually, which brings a lot of stress. The stress may distract the supervisor, leading him/her to take erroneous decisions. However, it is responsibility of the supervisor to take correct and smart decisions and to guide the agents correctly for maintaining contact center performance.

Therefore, there is a need for a system and method that is capable of handling service levels of a contact center at all times and further capable of assisting supervisor of the contact center to ensure performance and profit for the contact center.

SUMMARY

Embodiments in accordance with the present invention provide a service level controlling system for a contact center. The service level controlling system includes a monitoring module for monitoring predetermined operation statistics of a contact center. The service level controlling system further includes a publishing module for publishing pre-configured solutions to each of agents in the contact center based upon at least one of the monitored predetermined operation statistics falling outside a predetermined range. The service level controlling system further includes a controlling module for automatically bringing the at least one of the monitored predetermined operation statistics within the predetermined range based upon execution of the pre-configured solutions selected by the agents.

Embodiments in accordance with the present invention further provide a computer-implemented method for handling service levels in a contact center. The computer-implemented method includes monitoring predetermined operation statistics of a contact center, publishing pre-configured solutions to each of agents of the contact center based upon at least one of the monitored predetermined operation statistics falling outside a predetermined range, and dynamically bringing the at least one of the monitored predetermined operation statistics within the predetermined range based upon execution of the pre-configured solutions selected by the agents.

Embodiments in accordance with the present invention further provide a computer readable medium storing computer readable instructions when executed by a processor performs a method. The method includes predetermined operation statistics of a contact center, publishing pre-configured solutions to each of agents of the contact center based upon at least one of the monitored predetermined operation statistics falling outside a predetermined range, and dynamically bringing the at least one of the monitored predetermined operation statistics within the predetermined range based upon execution of the pre-configured solutions selected by the agents.

Further, the present invention can provide a number of advantages depending on its particular configuration. First, embodiments of the present invention provide a system and a method for handling call traffic exceeding a threshold. Moreover, embodiments of the present invention provides system and method to control and handle other out of bound conditions in a contact center, such as but not restricted to, agent responsiveness time for new work requests, average handling time of work requests, and target revenue of sales team etc. Hence, the call traffic is automatically handled even during sudden burst of activities. Further, the present invention assists a supervisor of a contact center in obtaining advice and assistance of agents for managing a real-time crisis in the contact center. The present invention further provides a system and a method that is capable of anticipating situation of crisis in the contact center and may implement remedies even before a call traffic threshold is reached.

Furthermore, by using embodiments of the present invention, the supervisors do not need to update their memories with updated skills of their agents, as embodiments of the present invention keep the activities and calls of the agents of the contact center under surveillance. Furthermore, embodiments of the present invention enable all of the agents of the contact center to present their opinions and suggestion to conclude remedies for the crisis.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible, utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an ACD or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 1:
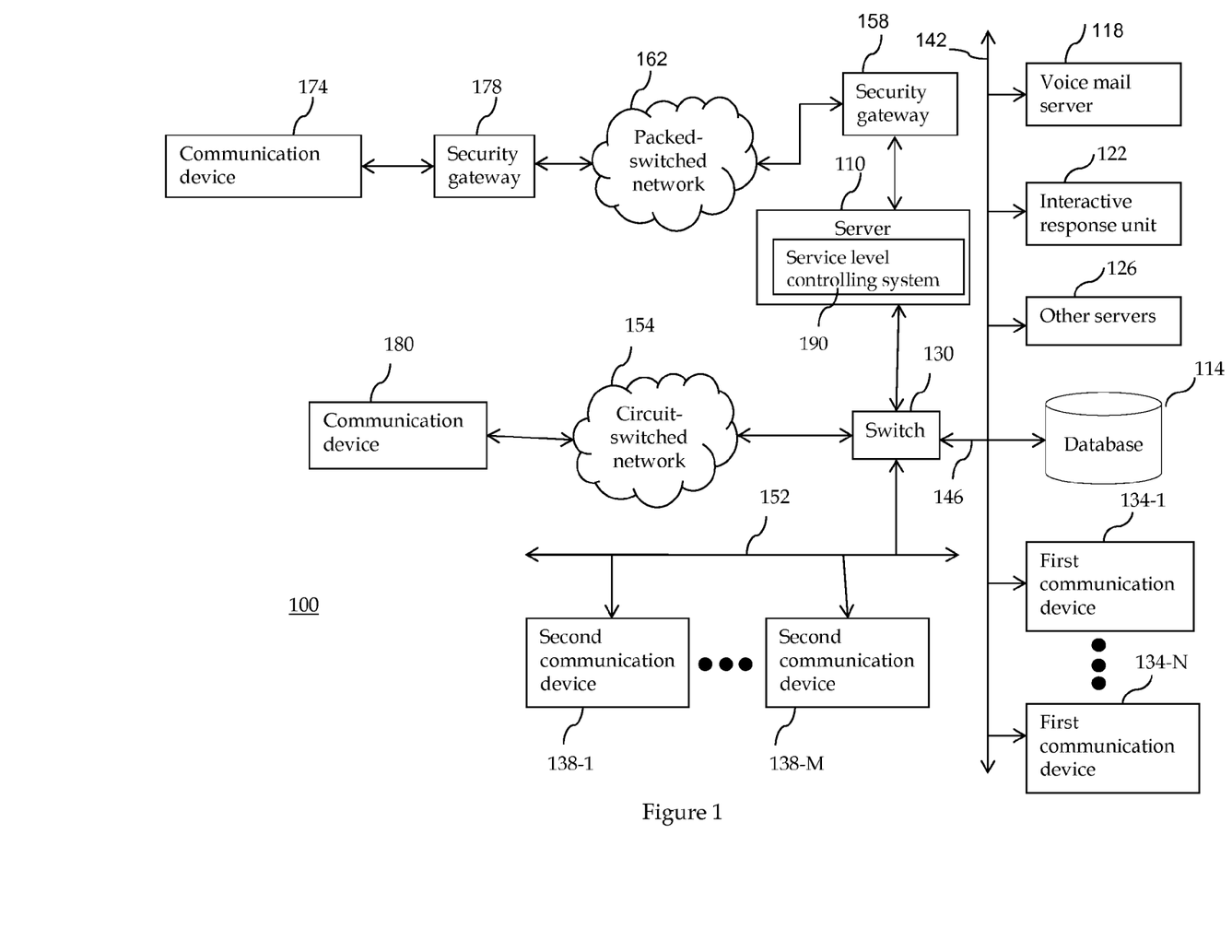
FIG. 1 shows an illustrative embodiment of the present invention, in accordance with an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Response unit (e.g., IVR) 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks. The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

In an embodiment, the gateway 158 (as shown in FIG. 1) can be Avaya Inc.'s, G700 Media Gateway™ and may be implemented as hardware such as via an adjunct processor (as shown) or as a chip in the server.

The first communication devices 134-1 . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1 . . . 138-M are circuit-switched. Each of the communication devices 138-1 . . . 138-M corresponds to one of a set of internal extensions Ext1 . . . ExtM, respectively. The second communication devices can include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch or server and first and second communication devices, i.e., the present invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a gateway 178, and the circuit-switched network 154 with an external second communication device 180.

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the present invention to any particular arrangement of elements.

Figure 2:
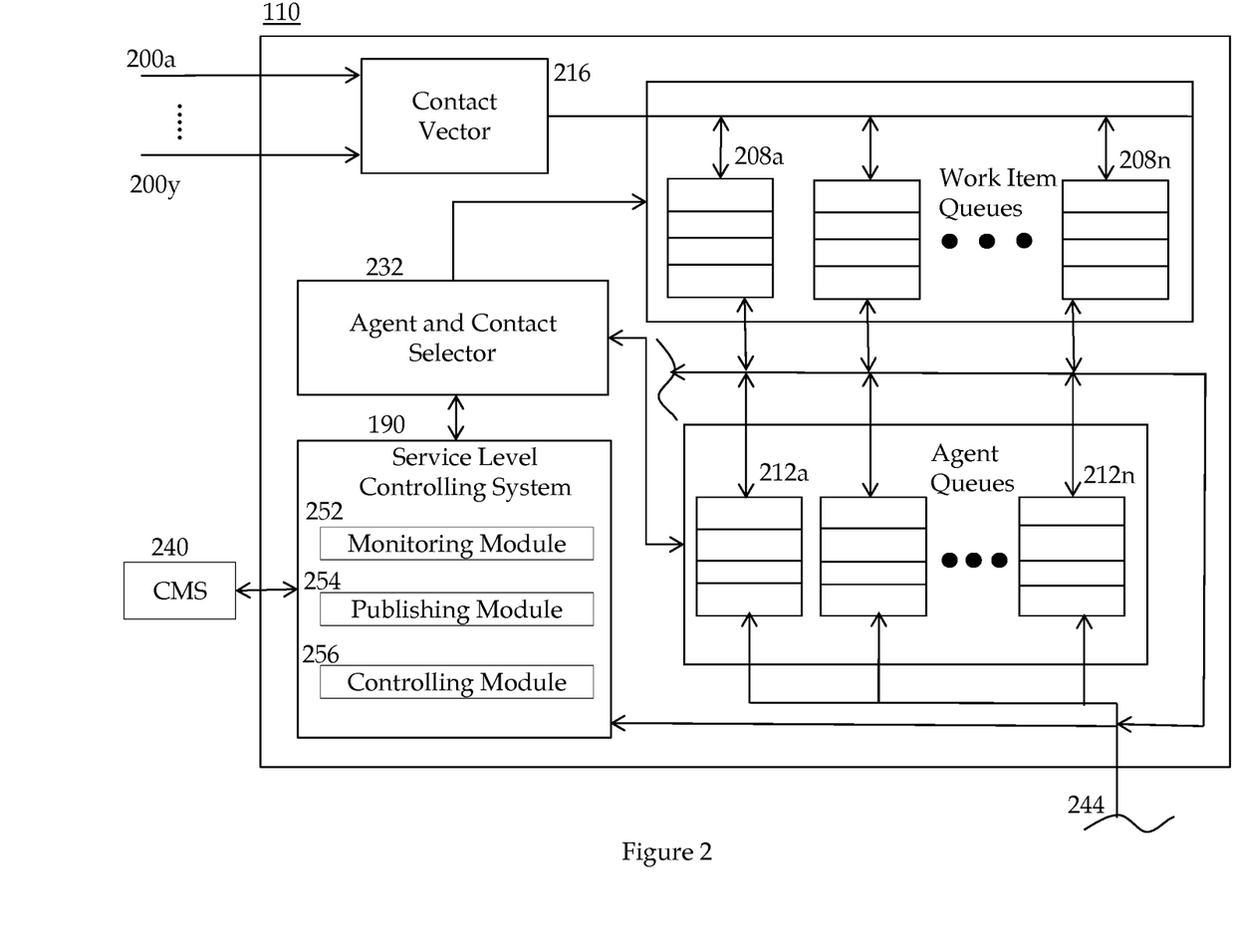
FIG. 2 is a block diagram of a server according to an embodiment of the present invention.

Further, as shown in FIG. 1, the contact center comprises the server 110, configuration of which is explained further in conjunction with FIG. 2 of the present invention. The server 110 further comprises a service level controlling system 190 as a preferred embodiment of the present invention. The detailed configuration of the service level controlling system 190 is also explained further in conjunction with FIG. 2 of the present invention.

In an exemplary embodiment, the service level controlling system 190 is configured to monitor predetermined operation statistics of the contact center 100. The predetermined operation statistics of the contact center 100 may include, but are not restricted to call traffic, agent responsiveness time for new work requests, average handling time of work requests, target revenue of sales team and so forth. The call traffic may further include, but is not restricted to, telephone calls, web chats, audio messages, video messages, text messages, postings to social media sites, and postings to blog sites. In an embodiment, one or more software bots may be configured to detect postings to social media sites and blog sites that are related to services provided by the contact center. The software bots may further be configured to share related media postings with the service level controlling system 190 and with the supervisor of the contact center.

The service level controlling system 190 is further configured to monitor availability of agents of the contact center with their current status. The status of the agents may refer to the status of their work, for example, auxiliary (AUX), not ready (NRdy), or after call work (ACW).

Further, the service level controlling system 190 may calculate call traffic based on the availability of the agents in the contact center. In an embodiment, the call traffic may represent a ratio of available agents in the contact center over number of incoming calls, at a particular period of time. Further, a threshold value of the call traffic may be pre-set by the service level controlling system 190, according to number of available agents. If a call traffic threshold value is reached/breached, then the contact center may need to put incoming calls in a waiting queue (so that as soon an agent gets free, he/she can attend a call from the waiting queue). Breach of threshold value may be an unwanted situation for a contact center as every call may be a business opportunity for the contact center.

Similarly, the service level controlling system 190 may be configured to determine other unwanted situations such as, but not restricted to, higher agent responsiveness time for new work requests, higher average handling time of work requests, lower revenue of sales team, and so forth in the contact center 100 and may take necessary actions to control such unwanted or out-of-bounds conditions to bring service level of the contact center 100 back to a normal or desired state. Hereinafter, such unwanted situations may be referred to as a situation of "crisis." The service level controlling system 190 may further be configured to automatically handle the crisis with or without supervision/permission of supervisor of the contact center 100.

The service level controlling system 190 may further have access to the database 114, having stored therein personal and professional details of all the employees of the contact center. In addition, the service level controlling system 190 may be configured to update the professional details of the employees of the contact center based on their daily work that is monitored by the service level controlling system 190. For example, if an English speaking employee requested the service level controlling system 190 to allocate some calls of French customers (who speaks in French language only), then the service level controlling system 190 may automatically update the database 114 for that employee with "French language" as his/her secondary language skill. The service level controlling system 190 may use such updated information in the future events where there will be requirement of more than existing French speaking employees by requesting the employees with secondary language skill as French to handle calls from French customers.

In an embodiment of the present invention, if a customer/caller needs to call the contact center 100, then the customer/caller may need to navigate through an IVR system of the contact center 100. This may help the customer to directly connect with required/desired department of the contact center 100. The IVR system may also let the callers/customers to select a preferred language of communication, based on which the IVR system intelligently rout the call to an agent who is fluent in the language selected by the caller or customer. The configuration of the IVR system is described further in conjunction with FIG. 3 of the present invention. The service level controlling system 190 may have access to the information processed by the IVR system. This may help the service level controlling system 190 to determine call traffic for a particular department of the contact center.

Further, in an embodiment, agents of the contact center may communicate with the service level controlling system 190 to inform the service level controlling system 190 corresponding to their discoveries of one or more problems and/or their probable solutions. Information given by the agents may be analyzed by the service level controlling system 190 and may be used to identify patterns of the information received from the agents. Such patterns may be used by the service level controlling system 190 to modify self service IVR system of the contact center 100. For example, if many agents respond to the service level controlling system 190 with text such as "A lot of callers asking launch date of product ABC", then a new recorded announcement may be injected at the top level of the IVR tree (of the contact center 100) to filter out such calls (by solving their query with the injected announcement) for bringing contact center service level back on track.

In another exemplary embodiment of the present invention, the service level controlling system 190 may be configured to monitor navigation patterns of callers on the contact center's IVR tree. For example, based on the navigation patterns, the service level controlling system 190 may detect from current navigation or from navigation history of callers that the majority of calls in a particular time period are routing to a complaint handling department or to a department that handles printing toners of printers. This may help the service level controlling system 190 to predict whether or not the threshold is going to reach for that department. If the service level controlling system 190 determines the threshold is going to be reached, then the service level controlling system 190 may put one or more agents (of that department) under surveillance to determine whether or not the majority of calls for that department concerns a similar issue and how the agents are solving that issue.

Thereafter, if the service level controlling system 190 determines that most of the calls are pertaining to a similar issue, then the service level controlling system 190 may either create a voice message or may copy/record voice of one or more agents (who are handling calls pertaining to the issue), and may insert the voice message at a suitable level of IVR system. In an embodiment, the suitable level is at the top of the IVR system, such that any caller will get the message in the beginning of the call with the IVR system. This may solve the query or issues of several callers who are calling regarding the issue and such callers may stop navigating further in the IVR levels to contact with agents of the contact center. This may reduce the call traffic and may prevent the contact center from call traffic crisis even before breaching of call traffic threshold.

For example, if a rumor enters in the market that a cell phone company is going to end their business in China, then a lot of Chinese speaking customers may call the contact center of that company to confirm the news. This may result in a lot of unnecessary calls for that contact center. The service level controlling system 190 may detect that and may identify the cause of the calls. The service level controlling system 190 may then put a message in the IVR tree of that contact center, so all the callers who are willing to talk to customer executives of the contact center can listen/read/view the message to know the company is not going to end their business in China.

This message may satisfy queries of a lot of callers and they may disconnect the call before even connecting to the customer executives of the contact center. This may reduce the call traffic of the contact center and may prevent the contact center from reaching a critical threshold and thus crisis. In an embodiment, even before the threshold is reached, or even before the agents and the supervisors of the contact center get to know the call traffic is increasing, the service level controlling system 190 may resolve the issue of the callers by adding a tailored message/announcement in the IVR system.

Further, in the case where the service level controlling system 190 detects the increasing call traffic not pertaining to a common issue, or if the added message (in the IVR system) is not reducing the call traffic, then the service level controlling system 190 may inform the supervisor and the agents of the contact center corresponding to the increasing call traffic. The service level controlling system 190 may circulate an electronic message to all the employees of the contact center corresponding to the increasing call traffic (before or/and after breach of threshold limit of calls).

In an embodiment, the service level controlling system 190 may only inform the supervisor of the contact center and the supervisor may publish detail of out-of-control condition/problem to the agents. For example, a graph of average speed of answer over the last 15 minutes for a specified incoming contact type may be published. In an embodiment, the supervisor may have a suitably skilled pool of resources (agents) working in the contact center. The behavior/knowledge of the agents may contribute in unfolding the problem. Also, there may be agents in the contact center, who could assist with alleviating the situation.

In another embodiment, the supervisor of the contact center may determine or anticipate that call traffic is increasing and the supervisor may trigger a device that activates the service level controlling system 190, and the supervising system may then take over. The supervising system may then start analyzing the situation and may provide necessary pre-configured alleviating options that may reduce the call traffic.

Further, each agent in the contact center may be presented with a view of the problem and a list of pre-configured alleviation options that are specific to that agent (by the service level controlling system 190). For example, a list pushed to agent-A might include a request to finish current (ongoing) call, which has been active for 15 minutes, as quickly as possible, while a list pushed to agent-B might be to come out of 'AUX'/'NRdy'/'ACW' work state, as described above, and to handle incoming calls. In some cases, work state changes can be forced by the service level controlling system 190. In such case, an agent who is in 'AUX' mode and documenting summary of a call may be forced by the service level controlling system 190 to be in active mode so the agent can be allocated a call to attend.

The agents may also send notification/message back to the service level controlling system 190 informing that despite current system rules, they are capable of helping due to adjacent skills (i.e., such work is broadly within their comfort zone).

In an embodiment, the managing module may use a NLP engine (natural language processing engine) for interpreting context, intention, or purpose of the messages received from the agents or supervisor. For example, if the call traffic pertains to a printer, then an agent, who works in department of cartridges of printers, may volunteer to the service level controlling system 190 saying he/she can also handle calls related to the printer as he/she has certain knowledge about printers. The service level controlling system 190 may interpret the message (with the help of the NLP engine) of the agent and may start routing printer related calls to that agent. In addition, the service level controlling system 190 may update profile of that agent (in database 114) with a technical skill of printers as secondary skill. In an embodiment, before routing calls to the agent, the service level controlling system 190 may confirm/approve this action from the supervisor of that contact center. In another embodiment, the service level controlling system 190 may confirm/approve this action from the supervisor of that contact center.

As another example, consider a situation in which rumors of an inkjet printer product recall in Germany have resulted in a burst of support calls and web chats to a support/contact center. Supervisor of that support center is struggling to bring the service level back within threshold. Further, the supervisor pushes details of problem with pre-configured links (with help of the service level controlling system 190) as problem alleviating options to his/her agent pool. Agents click the pre-configured links that indicate volunteer action they intend to take. The pre-configured links activate solutions such as agreeing to a shorter union break for the next hour, or permitting the system to change their multiplicity to two voice calls (and manage the overhead of switching between two callers for a period of time).

Other pre-configured solutions may include, but are not restricted to, informing at the agents to read a script to all callers querying about the problem, or instructing the agents to finish every individual call in not more than 30 seconds, for next hour. In an embodiment, the service level controlling system 190 may instruct the agents to simply apologize to certain callers and may provide a script to read. Further, the service level controlling system 190 may provide permission to the agents to be abrupt in disconnecting the calls.

Further, an electronic message that is pushed to the agents (for informing agents regarding the call traffic problem) may have an option for the agents to reply back to the supervisor/service level controlling system 190. An agent may reply to the supervisor or to the service level controlling system 190 saying: "I only deal with toner cartridge ordering, but I speak conversational German and don't mind speaking about the printer. Send some calls to me if you like." This may be interpreted by the service level controlling system 190, and this agent may be automatically added to product recall skillset for the next hour. Further, in an embodiment, the service level controlling system 190 may manage a reward system for agents who are shown to have assisted positively in rectifying a crisis.

Referring to FIG. 2, one possible configuration of the server 110 is depicted. The server 110 is in communication with a plurality of customer communication lines 200*a-y* (which can be one or more trunks, phone lines, etc.) and agent communication line 240 (which can be a voice-and-data transmission line such as LAN 142, as shown in FIG. 1, and/or a circuit switched voice line). The server 110 can include an operational contact center reporting module (not shown), such as Avaya IQ™, CMS™, Basic Call Management System™, Operational Analyst™, and Customer Call Routing or CCR™ by Avaya, Inc., gathers call records and contact-center statistics for use in generating contact-center reports.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

Moreover, as shown in FIG. 2, among the data stored in the server 110 is a set of contact queues 208*a-n* and a separate set of agent queues 212*a-n*. Each contact queue 208*a-n* corresponds to a different set of agent queues, as does each agent queue 212*a-n*. Conventionally, contacts are prioritized and are either enqueued in individual ones of the contact queues 208*a-n* in their order of priority, or are enqueued in different ones of a plurality of contact queues that correspond to a different priority. Likewise, each agent's queues are prioritized according to his or her level of expertise or skill in that queue, and either agents are enqueued in individual ones of agent queues 212*a-n* in their order of expertise level or are enqueued in different ones of a plurality of agent queues 212*a-n* that correspond to a queue and each one of which corresponds to a different expertise level.

Included among the control programs in the server 110 is a control vector 216 that controls work item routing process. Contacts incoming to the contact center are assigned by the control vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator, and each of the contact queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

According to at least one embodiment, an agent and contact selector 232 (hereinafter, may be referred to as "selector 232") is provided. The selector 232 and the service level controlling system 190 are embodied in the server 110. Further, the selector 232 monitors the occupants of the work item and queues 208a-n and 212a-n, respectively, and contact center objectives, rules, and policies and assigns agents to service work items. As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the selector 232 forwards instructions to the component to forward or route the contact to a specific contact center resource, such as the interactive response unit 122, the voice mail server 118, and/or first or second communication device 134, 138 associated with a selected agent. The selector 232 distributes and connects these contacts to communication devices of available agents based on the predetermined criteria noted above. When the selector 232 forwards a voice contact to an agent, the selector 232 also forwards customer-related information from databases 114 to the agent's computer work station for previewing and/or viewing (such as by a pop-up display) to permit the agent to better serve the customer. The agents process the contacts sent to them by the selector 232.

The service level controlling system 190, as shown in FIG. 2, includes certain modules, such as, but not restricted to, monitoring module 252, publishing module 254, and controlling module 256. The monitoring module 252 is configured to monitor predetermined operation statistics of the contact center. The predetermined operation statistics of a contact center may include but are not limited to, call traffic, agent responsiveness time for new work requests, average handling time of work requests, and target revenue of sales team etc. Further, call traffic may include, but is not limited to, telephone calls, web chats, audio messages, video messages, text messages, postings to social media sites, and postings to blog sites.

In addition, the monitoring module is configured to monitor if a threshold level of incoming calls in the contact center is reached or is anticipated to reach. If the call traffic is continuously increasing then the monitoring module may anticipate the call threshold level will be reached soon. Additionally, the monitoring module 252 may also monitor a navigation pattern of the callers calling the contact center and may save the navigation pattern as navigation pattern history in the database 114.

Further, the monitoring module 252 is configured to analyze IVR system of the contact center to determine destination of the increasing call traffic in the IVR tree of the contact center's IVR system. The destination of the call traffic may help the monitoring module 252 in determining the purpose of the callers. For example, if all callers are destined in the IVR tree to contact customer executives who handle laser printers, then the monitoring module may interpret there is some issue with the laser printers.

Furthermore, the monitoring module 252 is configured to keep the agents under surveillance. This may enable the monitoring module 252 to determine the issue (such as issue regarding laser printers) behind increase in the call traffic and corresponding solution for reducing the call traffic. Further, the monitoring module may keep the agents and their activities under surveillance. This may help the monitoring module 252 to analyze performance of the contact center.

For example, the monitoring module 252 may monitor which agents are logged in, what they're doing, what calls they're taking, what is the call skill for those calls, what languages are being spoken on those calls, how long the calls are taking on average, moving window, how the calls are doing (i.e., was the call good, bad, an okay call). The monitoring module also monitors if a caller is a gold customer or a bronze customer, etc. In an embodiment, the monitoring module 252 may be referred to as a statistical soapbox of the contact center.

Further, based on the data monitored by the monitoring module 252, the monitoring module 252 may inform the publishing module 254, in case if at least one of the aforementioned monitored predetermined operation statistics falls outside a predetermined range. In an embodiment, the service level controlling system 190 may have a predetermined range for every aforementioned monitored predetermined operation. For example, in case of call traffic, a predetermined range/threshold may be 40 calls per minute, in case of 'agent responsiveness time for new work requests' a predetermined range/threshold may be breached if one or more incoming calls are received by contact center agents in more than 20 seconds, in case of 'average handling time of work requests' a predetermined range/threshold may be breached if one or more agents are taking more than 30 minutes to finish incoming calls, in case of 'target revenue of sales team' a predetermined range/threshold may be breached if per hour revenue of the sales team is going below 4000$.

Based on the data and information received from the monitoring module 252, the publishing module 254 may perform certain pre-configured solutions. In an embodiment, the publishing module 254 is configured to publish pre-configured solutions to each of agents in the contact center based upon at least one of the monitored (by the monitoring module 252) predetermined operation statistics falling outside the predetermined range/threshold. In another embodiment, the publishing module 254 is configured to publish details of range breach to each of the agents in the contact center. In yet another embodiment, the publishing module 254 is configured to enable each of the agents to provide inputs to bring the at least one of the monitored predetermined operation statistics within the predetermined range.

For example, the publishing module 254 may be configured to publish/send a notification/message/solution to the agents of the contact center when at least one of the monitored predetermined operation statistics falls outside a predetermined range, such as if call traffic exceeds a predetermined range/threshold. In another embodiment, the publishing module 254 may also publish/send a notification/message to the supervisor of the contact center. Further, the publishing module 254 may be configured to send a list of the pre-configured solutions/options to the agents. In an embodiment, the pre-configured solutions may be specifically tailored for each agent of the contact center In an embodiment, the pre-configured solutions may be tailored for each agent in the contact center based on real time situation of the agent. For example, the pre-configured solutions may include a step of informing at least one agent to finish an active call. As another example, the pre-configured solutions may include a step of informing at least one agent to finish every incoming work request within a predetermined time period.

In addition, the pre-configured solutions may include certain instructions for the agents of the contact center, such as, but not restricted to, avoiding taking break from work, avoiding taking day off, or avoiding long duration calls. Further, the tailored instructions may include, but are not limited to, instructing an agent to disconnect a call as soon as possible, instructing an agent to change his/her current state to 'active' from 'AUX,' forcefully changing state of an agent, providing an agent a written script for reading to a customer that is currently on call, inviting an agent to handle certain calls that are not specific to his/her expertise, querying an agent for a solution of a problem, asking confirmation of an agent on an decision, etc.

Furthermore, based on the published notifications/pre-configured solutions, one or more agents may reply back with suggestions, proposals, instructions, or with some information to the service level controlling system 190. Such information may be received by the controlling module 256. Based on the execution of the pre-configured solutions selected for the agents and based on the replies received from the agents corresponding to the situation of crisis, the controlling module may be configured to automatically bring the monitored predetermined operation statistics within the predetermined range. Further, the publishing module may also be configured to publish a reward associated with the pre-configured solutions published to the agents, based on participation or performance of the agents to control crisis situation of the contact center.

In an embodiment, controlling module 256 may be configured to make temporal changes to contact center configuration based upon the inputs of the agents. In an embodiment, the controlling module 256 may make temporal changes to agent's skills based upon the inputs of the agents. For example, the controlling module 256 may change/update skill information of an agent based on a new skill disclosed by the agent.

Further, the controlling module 256 may add at least an agent for improving a service level requiring the agent's skill based upon the inputs of agents. For example, if a contact center needs more agents to sell a printer's cartridge for meeting sales targets, then the controlling module 256 may check profile information of all agents of the contact center (who are not in printer's cartridge sales team) to determine agents who have prior experience of selling the printer's cartridges. In an embodiment, if an agent replies that he/she is willing to join printer's cartridge sales team to help them, then the controlling module 256 may use such information and may add the agent into the printer's cartridge sales team.

Furthermore, the controlling module 256 may modify at least one software bot that is associated with the contact center, based upon the inputs of agents. The software bot may be an auto texting software bot that is configured to communicate with customers over Internet for their assistance.

In an exemplary embodiment, if the controlling module 256 determines that a lot of customers are questioning the software bot about recall news of a printer, then the controlling module 256 may automatically determine (with the help of agents) solution of their question and may configure the software bot to provide to provide the determined solution to every customer who questions about the recall news.

In another exemplary embodiment, if the controlling module 256 determines that a lot of customers are calling (via IVR system) the contact center to query corresponding to recall news of a printer, then the controlling module 256 may automatically determine (with the help of agents) solution of their queries and may modify the IVR menu of the contact center's IVR system by adding an announcement message at top of IVR menus to provide the determined solution to every customer who calls the IVR system of the contact center.

For example, the controlling module 256 may receive replies from the agents based on the published pre-configured solutions. The controlling module 256 may use a using a NLP engine (natural language processing engine) in order to interpret replies of the agents. Further, the NLP engine (not shown in the Fig.) may further be used for interpreting context and purpose of the received messages. Furthermore, based on the interpretation of the replies of the agents, the controlling module 256 may determine if a reply consists a suggestion, an instruction, a request, or information. In an embodiment, the controlling module 256 may be configured to take permission of supervisor of the contact center before executing any operation.

Moreover, the controlling module 256 may use information received from the reply of the agents to execute a step or activity, such as, accepting the message, rejecting the message, implementation of context of the message, or forwarding the message to supervisor of the contact center for approval. In an embodiment, the controlling module 256 may upload the given information at a top hierarchy level (of IVR menus) in the IVR system of the contact center. This may enable the callers to receive the information at the beginning of the IVR call. For example, if an agent messaged the service level controlling system 190 that the call traffic can be reduced if a custom message "Model xyz will not be recalled from market" is added in IVR system of the contact center, then the controlling module 256 of the service level controlling system 190 may interpret the message and may add the message in the IVR.

In an exemplary embodiment of the present invention, the controlling module 256 may analyze IVR tree navigation history of the callers to determine if the majority of the callers are following similar navigation pattern to contact to the contact center. In case, if the callers are following similar navigation pattern, then the controlling module 256 may determine root of the problem for which the callers are contacting the contact center. For example, if majority of calls are following an IVR navigation pattern that leads them to ask queries (from agents) corresponding to a particular model of inkjet printer, then it will be obvious for the controlling module 256 to interpret that the call traffic is due to some issue in that printer.

Further, after determining the root of the problem, the controlling module 256 may create a custom/tailored message to satisfy the callers those are calling regarding the problem. Thereafter, the controlling module 256 may insert the message at the top of the IVR tree of the contact center's IVR system. For example, the controlling module 256 may create a message "If you are calling regarding Printer 'abc', please be informed the printer 'abc' will be recalled from market on 4 Jun. 2013". This may solve the concern of the callers who wanted to know the date of recall of the printer, and hence may not go forward in the IVR system to contact agents of the contact center. This may further reduce the call traffic.

Furthermore, in an embodiment of the present invention, the controlling module 256 may modify data uploaded at various nodes of the self service IVR system of the contact center based on instructions of contact center's supervisor. The controlling module 256 may receive instructions from the supervisor of the contact center to add, delete, or modify data from any node in IVR tree of the contact center, i.e., the controlling module 256 may add/delete/modify text/audio/video messages/announcements from any node of the IVR tree. Further, the controlling module 256 may also be configured to ask for approval from supervisor of the contact center before making any changes to the contact center configuration.

Figure 3:
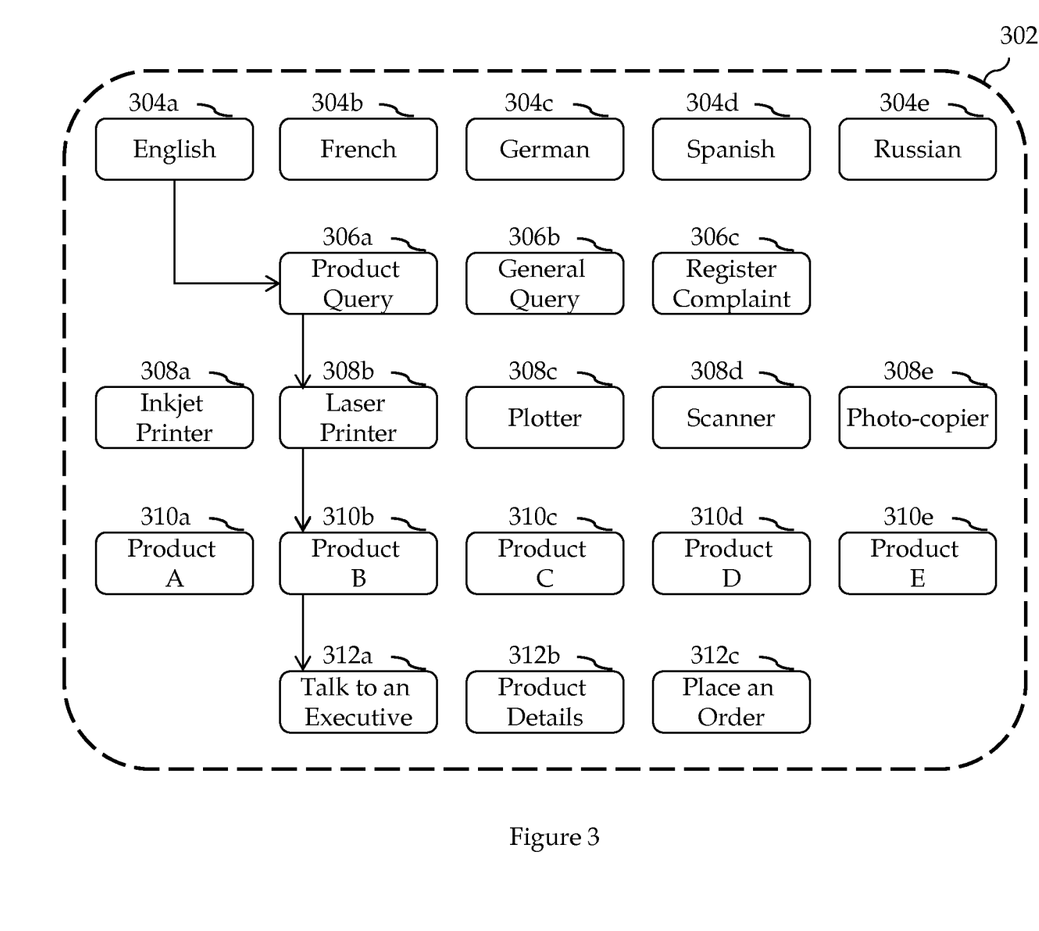
FIG. 3 is a structural view of an IVR tree of a contact center, in accordance with an embodiment of the present invention.

FIG. 3 is a structural view of IVR tree 302 of an IVR system for a contact center. The IVR tree 302 includes various nodes as illustrated in the FIG. 3. Further, each row of the nodes in the IVR tree 302 illustrates an IVR level of navigation. The first row of IVR tree 302 having nodes 304*a-e*, is the first level of the IVR system of the contact center. In an embodiment, the contact center may work for an organization that manufactures/sells printing devices. Further, the first level of the IVR system may be the level that is encountered at first place to a caller of the contact center.

As shown, the first level illustrates various language options such as, for example, English, French, German, Spanish, and Russian. In an embodiment, an IVR system of any contact center may have any number of language options and on any level of the IVR tree 302. Further, at second level of the IVR tree 302, i.e., as shown in the second row from the top of the IVR tree 302, IVR nodes 306*a-c* are illustrated. The second level illustrates a level where a caller is asked to choose whether the caller has called to ask a query about a product (product query 306*a*), whether the caller has called to ask a general query 306*b* about the products of the organization, or whether the caller has called to register complaint 306*c* against the organization.

Further, at third level (from top) of the IVR tree 302, i.e., as shown in the third row of the IVR tree 302, IVR nodes 308*a-e* are illustrated. The third level illustrates a level where a caller is asked to choose whether the caller has called to ask regarding an inkjet printer 308*a*, laser printer 308*b*, plotter 308*c*, scanner 308*d*, or photo-copier 308*e*. Similarly at forth level, the caller is asked to choose a product for which the caller has called, i.e., Product A-E, 310*a-e*, respectively. Further, at level five, the caller make a decision, whether or not, the caller needs to talk to a customer executive 312*a* of the contact center of the organization, or the customer needs the IVR system to provide details corresponding to the product that is selected at the forth level of the IVR tree 302. Further, the caller may also place an order of the product selected at level four via the IVR system.

Furthermore, in the FIG. 3 of the present invention, a view of navigational history of a caller is illustrated in the IVR tree 302. As shown, the caller first selected IVR node 304*a* to choose English language as preferred language of communication. Thereafter, at level 2, the caller selected IVR node 306*a* to ask a query against a laser printer (308*b*, at level 3) of model B (310*b*, at level 4). Further, at level 5, the caller selected the IVR node 312*b* to talk to an agent of the contact center of the organization regarding the laser printer of model B of the organization.

In an exemplary embodiment of the present invention, the service level controlling system 190 of the contact center 100 may analyze such navigational history views of a number of callers in particular time period (after anticipating crisis in the contact center) to determine that majority of the call traffic pertains to the query related to the model B of the laser printer of the organization. Thereafter, the supervising system may either check history of calls or may analyze plurality of currently active calls (those pertaining to model B of the laser printer) to determine if the agents of the contact center are using common replies to the callers or not. If the supervising system determines the agents are using common replies then the service level controlling system 190 may either create a message or may record the message from an active call, and may insert the message at the node 310*b*. Thereby, all callers selecting the node 310*b* will notice the message that is added by the service level controlling system 190 to solve queries of the callers. The callers will therefore get the answer of their queries in advance at level 4 of the IVR tree 302. Therefore, the callers may not attempt to call the customer executives, which will reduce the call traffic of the contact center. In an embodiment, the message can be added to any node of any level of the IVR tree 302. In another embodiment, the supervising system may directly analyze current navigation of callers in the IVR tree 302, in spite of analyzing navigational history views of the callers.

In another embodiment, if the service level controlling system 190 determines the queries of the callers are not related to a common problem, then the service level controlling system 190 may inform the agents and the supervisor of the contact center corresponding to the anticipation of reaching call threshold in a short while. In addition, the service level controlling system 190 may also circulate an electronic message to the supervisor and agents describing the aspects of the problem. For example, the service level controlling system 190 may describe the call traffic is of people speaking English language and pertains to product B of laser printers.

Further, the service level controlling system 190 may provide pre-configured alleviation options to English speaking team of agents handling the calls related to the laser printers. In addition, the service level controlling system 190 may send an invite to the other agent teams those are fluent in other languages (not fluent in English) and handle laser printers calls, for volunteering if any of them believes they can handle English speaking callers. Additionally, the service level controlling system 190 may send a notification informing other teams who do not deal with laser printers and may or may not speak English, corresponding to the situation. The agents may then analyze the situation and may then send their expert views about the situation to the service level controlling system 190 or to the supervisor. The service level controlling system 190 may analyze the replies of the agents and may determine a suitable solution of the problem. The service level controlling system 190 may or may not ask permission from the supervisor before implementing the determined solution.

Figure 4A:
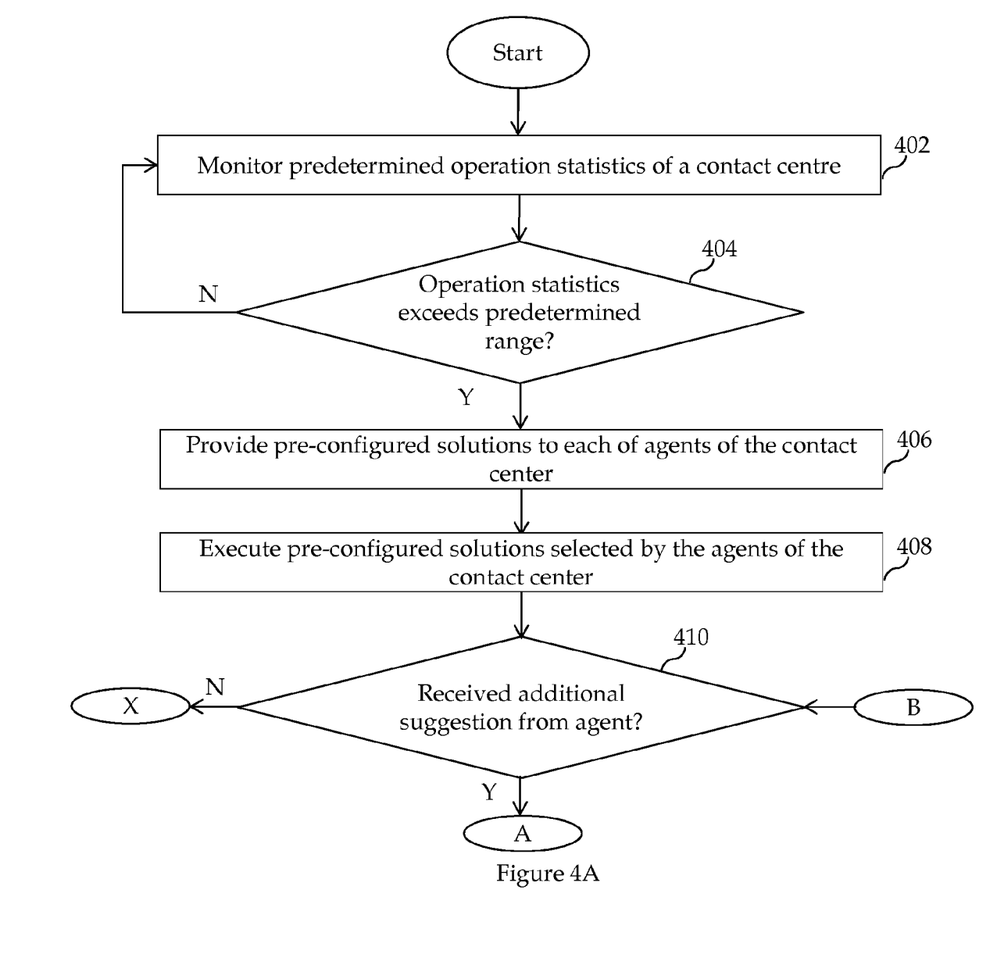
FIGS. 4A and 4B are a flowchart of a method for handling service levels in a contact center, in accordance with an embodiment of the present invention.
Figure 4B:
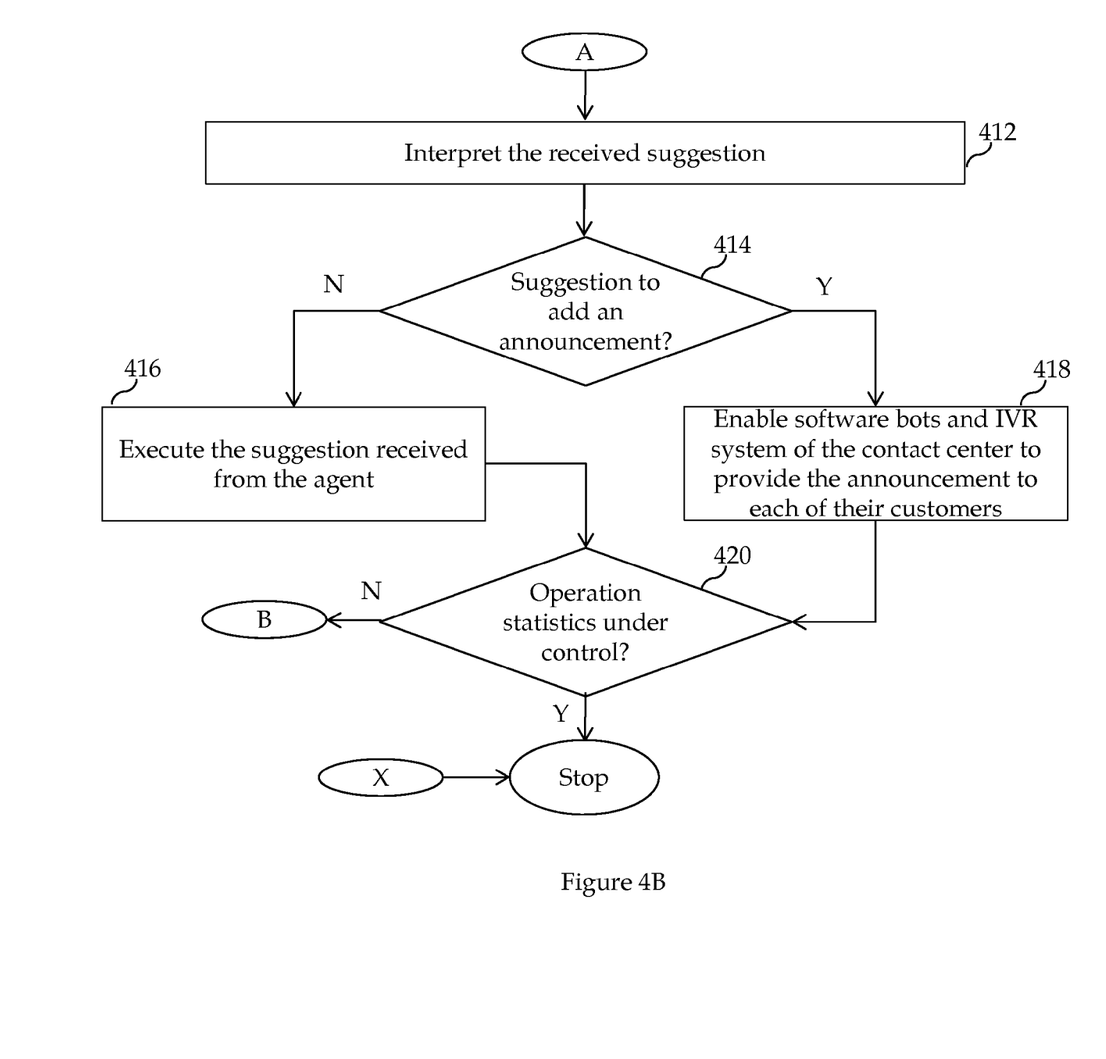

FIGS. 4A and 4B are a flowchart of a method for handling service levels in a contact center. At step 402 (as shown in FIG. 4A), a system such as service level controlling system 190 of a contact center monitors predetermined operation statistics, such as but not restricted to, incoming work request traffic, agent responsiveness time for new work requests, average handling time of work requests, and target revenue of sales team etc. In an embodiment, the aforementioned operation statistics may be monitored by the monitoring module 252 of the service level controlling system 190. Further, the service level controlling system 190 may store the monitored information in a database.

At step 404, the service level controlling system 190 may check if one (or more) of the monitored operation statistics of the contact center is falling outside a predetermined range or not. In an embodiment, if any of the monitored operation statistics of the contact center is falling outside a predetermined range, then the contact center may be considered to be facing a situation of crisis, which may affect business of the contact center. Further, if the service level controlling system 190 determines that none of the monitored operation statistics of the contact center is falling outside a predetermined range, and is also not anticipated to fall outside in near future or so, then the method flow may start again from the step 402, where the service level controlling system 190 keeps monitoring the operation statistics of the contact center. Otherwise, if the service level controlling system 190 determines that one of the monitored operation statistics of the contact center is falling outside a predetermined range, or is anticipated to fall outside in near future, then the method flow may proceed forward to step 406.

At step 406, the service level controlling system 190 may publish pre-configured solutions to each of agents of the contact center based upon at least one of the monitored pre-determined operation statistics falling outside the predetermined range. In an embodiment, such publishing job may be performed by the publishing module 254. For example, the service level controlling system 190 may provide detailed description of the problem to the agents and supervisors of the contact center. In addition, the service level controlling system 190 may provide a list of pre-configured solutions/options that may be specifically tailored for each agent. For example, a list pushed to an agent may instruct the agent to finish every call before 30 seconds. Another list for another agent may instruct the agent to change his/her state to active for handling calls. These lists may be prepared by the service level controlling system 190 for handling the crisis on the contact center. In another embodiment, the service level controlling system 190 may provide a general list of pre-configured solutions to the agents of the contact center to have expert opinions of the agents on determining/selecting most suitable pre-configured solutions to control service levels of the contact center.

At step 408, preconfigured options selected by the agents are executed by the service level controlling system 190. In an embodiment, such execution may be performed by the controlling module 256. Further, based on the information provided to the agents, one or more agents may provide suggestions, instructions, or useful information to the service level controlling system 190. At step 410, it is determined by the service level controlling system 190 whether any of the agents sends a message/suggestion. If yes, the method may proceed forward to step 412, otherwise the method may end. Furthermore, at step 412 the service level controlling system 190 may use a NLP engine (natural processing engine) for interpreting context and purpose of the received message/suggestion from the one or more agents.

Thereafter, at step 414, the service level controlling system 190 determines if the received message/suggestion includes a suggestion for adding an announcement (which is also provided by the agent) in service system of contact center, such as but not restricted to the IVR system of the contact center, and software internet bots of the contact center. In case, if the received message does not include the suggestion to add an announcement then the method may proceed forward to step 416, where the service level controlling system 190 may implement the suggestion given by the agent. In an embodiment, the service level controlling system 190 may ask for approval from a supervisor of the contact center before implementing the suggestion received from the agent.

In case, if the received message includes the suggestion for adding an announcement then the method may proceed forward to step 418, where the service level controlling system 190 may insert the announcement at top hierarchy of the IVR system of the contact center, and may simultaneously configure the software internet bots of the contact center to provide the announcement to all those customers who try to communicate with them (with the software bots as they may be configured to assist customers over Internet via web chats). Such announcement may solve the queries of the customers/callers even before they talk to the customer executives of the contact center and hence, may not proceed forward in the IVR system for contacting the agents/customer executives. This may result in reduced call traffic and filtering of the unwanted calls.

Further, at step 420, the service level controlling system 190 may determine whether or not the operation statistics of the contact center are under control. In case, if the service level controlling system 190 determines that the operation statistics of the control center are under control, then the method may end. Otherwise, if the service level controlling system 190 determines that the operation statistics of the contact center is still not within predetermined range and is also not anticipated to be reducing soon, then the method flow may proceed backward and may start again from the step 410, as described above.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example, in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A service level controlling system in a contact center, comprising:
    a monitoring module configured in order:
        to monitor predetermined operation statistics of a contact center; and
        to detect if an operation statistic pertaining to a plurality of agents falls outside a respective predetermined range;
    a publishing module configured to publish, to the plurality of agents in the contact center, a respective pre-configured solution specific to each respective agent of the plurality of agents, based upon at least one of the monitored predetermined operation statistics falling outside the respective predetermined range; and
    a controlling module for automatically bringing the at least one of the monitored predetermined operation statistics within the predetermined range based upon execution of the pre-configured solutions selected by the agents and changes to contact center configuration based upon at least one input from at least one of the plurality of agents.

2. The service level controlling system of claim 1, wherein the monitored predetermined operation statistics comprises call traffic, agent responsiveness time for new work requests, average handling time of work requests, and target revenue of sales team.

3. The service level controlling system of claim 2, wherein the call traffic comprising telephone calls, web chats, audio messages, video messages, text messages, postings to social media sites, and postings to blog sites.

4. The service level controlling system of claim 1, wherein the publishing module further comprises publishing details of range breach to each of the agents in the contact center.

5. The service level controlling system of claim 1, wherein the publishing module further comprises enabling each of the agents to provide inputs to bring the at least one of the monitored predetermined operation statistics within the predetermined range.

6. The service level controlling system of claim 5, wherein the controlling module making temporal changes to contact center configuration based upon the inputs of the agents.

7. The service level controlling system of claim 6, wherein the controlling module making temporal changes to agent's skills based upon the inputs of the agents.

8. The service level controlling system of claim 6, wherein the controlling module asking a supervisor for approval before making changes to the contact center configuration.

9. The service level controlling system of claim 1, wherein the controlling module configured to add at least an agent for improving a service level requiring the agent's skill based upon the inputs of agents.

10. The service level controlling system of claim 1, wherein the controlling module comprises modifying an IVR menu of the contact center based upon inputs of the agents.

11. The service level controlling system of claim 10, wherein the controlling module comprises adding an announcement message at top of IVR menu.

12. The service level controlling system of claim 1, wherein the controlling module configured to modify at least one bot associated with the contact center, based upon the inputs of agents.

13. The service level controlling system of claim 1, wherein the publishing module comprises publishing a reward associated with the pre-configured solutions published to the agents.

14. The service level controlling system of claim 1, wherein the pre-configured solutions are tailored for each agent in the contact center based on real time situation of the agent.

15. The service level controlling system of claim 1, wherein the pre-configured solutions comprise informing at least one agent to finish an active call.

16. The service level controlling system of claim 1, wherein the pre-configured solutions comprises informing at least one agent to finish every incoming work request within a predetermined time period.

17. A computer-implemented method for handling service levels in a contact center, the computer-implemented method comprising:
    monitoring predetermined operation statistics of a contact center;
    publishing pre-configured solutions to each of agents of the contact center based upon at least one of the monitored predetermined operation statistics falling outside a predetermined range; and
    dynamically bringing the at least one of the monitored predetermined operation statistics within the predetermined range based upon execution of the pre-configured solutions selected by the agents and changes to contact center configuration based upon at least one input from at least one of the agents.

18. The computer-implemented method of claim 17, further comprising receiving an input from at least one agent for bringing the at least one of the monitored predetermined operation statistics within the predetermined range.

19. The computer-implemented method of claim 18, further comprising modifying an IVR menu of the contact center based upon the inputs of agents.

20. A non-transitory computer readable medium storing computer readable instructions when executed by a processor perform a method comprising:
    monitoring a predetermined operation statistic pertaining to a plurality of agents of a contact center;
    publishing, to a plurality of agents of the contact center, a respective pre-configured solution specific to said agent, based upon at least one of the monitored predetermined operation statistics falling outside a predetermined range; and
    dynamically bringing the at least one of the monitored predetermined operation statistics within the predetermined range based upon execution of the pre-configured solutions selected by the agents and changes to contact center configuration based upon at least one input from at least one of the plurality of agents.

* * * * *